US011971515B2

(12) United States Patent
Jiang et al.

(10) Patent No.: US 11,971,515 B2
(45) Date of Patent: Apr. 30, 2024

(54) DEEP LEARNING MODEL WITH DILATION MODULE FOR FAULT CHARACTERIZATION

(71) Applicant: Landmark Graphics Corporation, Houston, TX (US)

(72) Inventors: Fan Jiang, Sugar Land, TX (US); Philip Norlund, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 483 days.

(21) Appl. No.: 17/359,435

(22) Filed: Jun. 25, 2021

(65) Prior Publication Data

US 2022/0413173 A1 Dec. 29, 2022

(51) Int. Cl.
*G01V 1/30* (2006.01)
*E21B 49/00* (2006.01)
*G01V 1/18* (2006.01)
*G06N 3/04* (2023.01)
*G06N 3/08* (2023.01)

(52) U.S. Cl.
CPC ............. *G01V 1/307* (2013.01); *E21B 49/00* (2013.01); *G01V 1/181* (2013.01); *G06N 3/04* (2013.01); *G06N 3/08* (2013.01); *E21B 2200/22* (2020.05); *G01V 2210/63* (2013.01); *G01V 2210/65* (2013.01)

(58) Field of Classification Search
CPC ............. G01V 1/307; G01V 2210/63; G01V 2210/65; G06N 3/04; G06N 3/08; E21B 2200/22
USPC ........................................................ 702/114
See application file for complete search history.

(56) References Cited

U.S. PATENT DOCUMENTS

| 2009/0119018 A1* | 5/2009 | Priezzhev ............... G01V 1/301 702/11 |
| 2021/0063594 A1 | 3/2021 | Wang |
| 2021/0181362 A1* | 6/2021 | Jiang ...................... G01V 1/288 |
| 2021/0293983 A1 | 9/2021 | Wei et al. |
| 2021/0319304 A1* | 10/2021 | Tawil ...................... G01V 1/48 |

(Continued)

FOREIGN PATENT DOCUMENTS

WO   2021050122   3/2021

OTHER PUBLICATIONS

Hu et al., "Seismic Fault Interpretation Using Deep Learning-Based Semantic Segmentation Method", IEEE Geoscience and Remote Sensing Letters, (Year: 2020).*

(Continued)

*Primary Examiner* — Paul D Lee
(74) *Attorney, Agent, or Firm* — Kilpatrick Townsend & Stockton LLP

(57) ABSTRACT

A system can receive seismic data that can correlate to a subterranean formation. The system can derive a set of seismic attributes from the seismic data. The seismic attributes can include discontinuity-along-dip. The system can determine parameterized results by analyzing the seismic data and the seismic attributes using a deep learning neural network. The deep learning neural network can include a dilation module. The system can determine one or more fault probabilities of the subterranean formation using the parameterized results. The system can output the fault probabilities for use in a hydrocarbon exploration operation.

20 Claims, 7 Drawing Sheets

(56) References Cited

U.S. PATENT DOCUMENTS

2022/0206177 A1* 6/2022 Saikia .................. G06N 5/04

OTHER PUBLICATIONS

Hu et al., "Seismic Fault Interpretation Using Deep Learning-Based Semantic Segmentation Method", IEEE Geoscience and Remote Sensing Letters, vol. 19, No. 7500905, Dec. 14, 2020, pp. 1-5.
Li et al., "ADDCNN: An Attention-Based Deep Dilated Convolutional Neural Network for Seismic Facies Analysis With Interpretable Spatial-Spectral Maps", IEEE Transactions on Geoscience and Remote, vol. 59, No. 2, Jun. 12, 2020, pp. 1733-1744.
PCT Application No. PCT/US2021/039530, International Search Report and Written Opinion, Mailed On Mar. 24, 2022, 11 pages.
Jiang et al., "Seismic attribute-guided automatic fault prediction by deep learning", EAGE Annual Meeting, Extended Abstract, 2020, 5 pages.
Yu, "Multi-Scale Context Aggregation by Dilated Convolutions", published as a conference paper at International Conference on Learning Representation, 2016, 13 pages.

* cited by examiner

DEEP LEARNING MODEL WITH DILATION MODULE FOR FAULT CHARACTERIZATION

TECHNICAL FIELD

The present disclosure relates generally to hydrocarbon exploration and, more particularly (although not necessarily exclusively), to using a deep learning model with a dilation module for characterizing subterranean faults.

BACKGROUND

A hydrocarbon exploration operation can involve evaluating a subterranean formation for identifying hydrocarbon resources. The hydrocarbon exploration operation can include determining locations of geological faults. The geological faults can indicate a nearby presence of hydrocarbon resources or material such as oil, gas, or other suitable hydrocarbon material. The locations of the geological faults can be determined using operations that can involve other models, but the other models may not allow resolution or a high level of accuracy to be retained with respect to the locations of the geological fault. Accordingly, the other models may not be able to determine or otherwise identify some geological faults within a geological area of interest. Additionally, the other models may incorrectly identify features or locations of geological faults associated with the subterranean formation.

DETAILED DESCRIPTION

Figure 1:
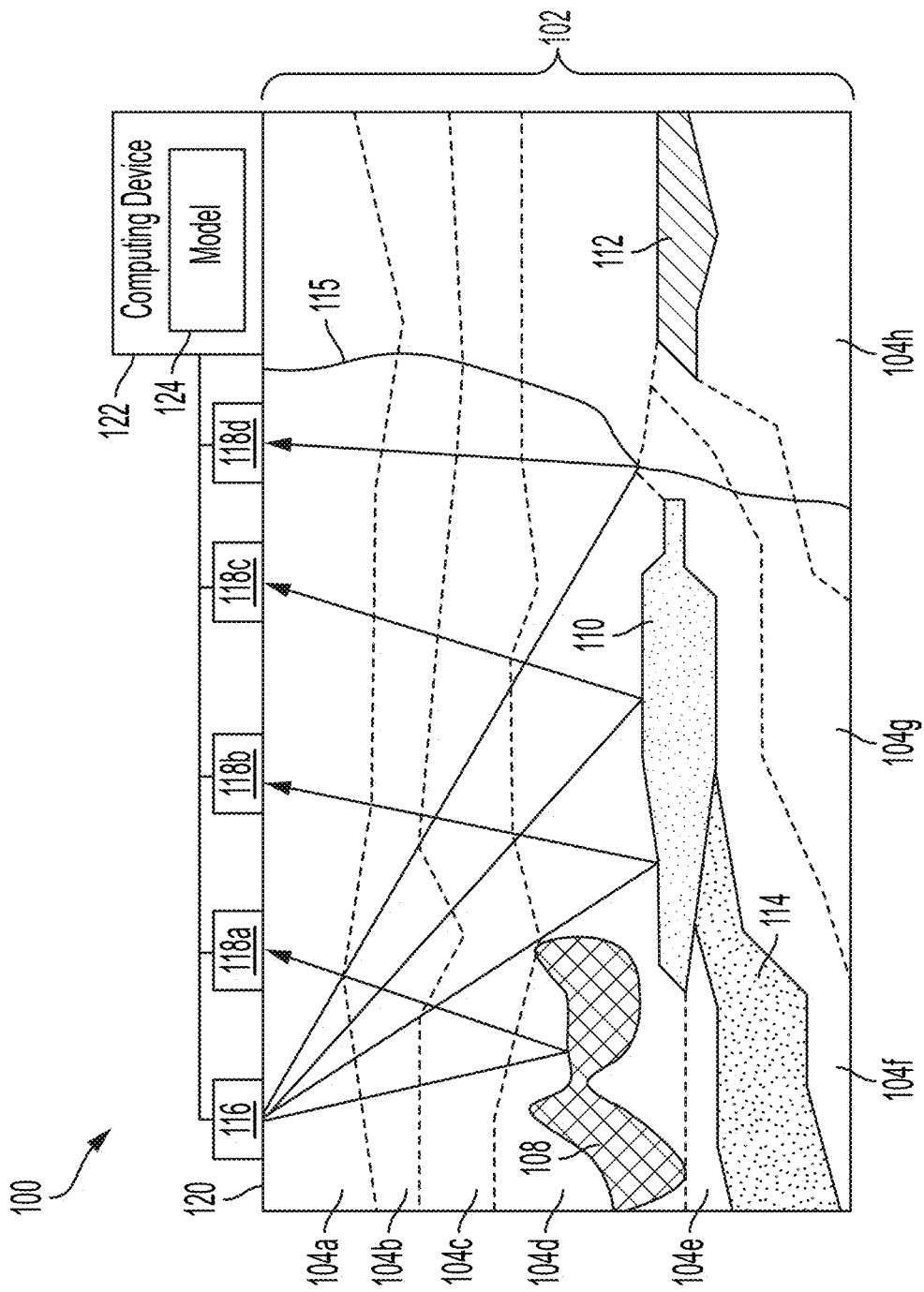
FIG. 1 is an example of a geological area of interest that includes a system for facilitating hydrocarbon exploration according to one example of the present disclosure.

Certain aspects and examples of the present disclosure relate to a deep learning neural network with a dilation module for characterizing geological fault locations for hydrocarbon exploration with respect to a subterranean formation. The deep learning neural network can be, or can otherwise include, a convolutional neural network or other suitable type of deep learning neural network for facilitating hydrocarbon exploration. The dilation module can include a set of dilated convolution layers that can each perform a dilated convolution with respect to data about the subterranean formation. Each dilated convolution layer of the set of dilated convolution layers can be characterized by a different dilation rate. A dilated convolution layer can involve a convolution operation, with a defined gap based on a predetermined dilation rate, applied to an input kernel, or convolution matrix, that can increase the size of the input kernel while retaining resolution of the input kernel.

A computing device can use the deep learning neural network to assist in various operations associated with the subterranean formation. For example, the computing device can use the deep learning neural network to identify or otherwise characterize geological faults with respect to the subterranean formation for a hydrocarbon exploration operation. By using the deep learning neural network, the computing device can determine and output fault probabilities that can indicate a location of one or more geological faults with respect to the subterranean formation. The output fault probabilities can be more accurate than fault probabilities output by other models, and the output fault probabilities can include a greater amount of indications of fault locations than fault probabilities output by the other models. Additionally, the output fault probabilities can be used to advise on, or adjust, one or more operations with respect to the subterranean formation. For example, the output fault probabilities can be used by a drilling operation to select a site in the subterranean formation to form a wellbore for extracting produced hydrocarbon material. The output fault probabilities can also be used to advise a hydrocarbon operation regarding whether to form an exploration well at one or more locations of the subterranean formation. Additionally or alternatively, by using the deep learning neural network, the computing device can use less computer memory, compared to an amount of computer memory used by other models, to determine the fault probabilities.

In some examples, the dilation module can include six dilated convolution layers and a stacking layer for stacking the dilated convolution layers. The dilation module can include other suitable amounts of dilated convolution layers and stacking layers for characterizing geological faults with respect to the subterranean formation. The deep learning neural network can use the dilation module to analyze seismic data and seismic attributes. The seismic data can characterize or otherwise relate to the subterranean formation, and the seismic attributes can be derived from the seismic data. The deep learning neural network can use the dilation module to calculate probabilities of a geological fault existing at one or more locations with respect to the subterranean formation.

Geological fault identification can be performed by a deep learning neural network, such as a convolutional neural network. The convolutional network can include the dilation module, a set of convolution layers, a set of pooling layers, and a set of upsampling layers. In some examples, the convolutional neural network can include 14 convolution layers in two groups, three maximum pooling layers, and three upsampling layers. A first group of convolution layers can include seven convolution layers that are before the dilation module, and a second group of convolution layers can include seven convolution layers that are after the dilation module. The three maximum pooling layers can be interspersed between the first group of convolution layers, and the three upsampling layers can be interspersed between the second group of convolution layers. In other examples, the convolutional neural network can include 10 to 18 convolution layers, one to five pooling layers, and one to five upsampling layers. The convolutional neural network can include other suitable amounts of convolution layers, pooling layers, upsampling layers, and the like.

Additionally, geological fault identification can involve semantic segmentation. Semantic segmentation can classify each seismic pixel of a set of seismic pixels, which can be received with data relating to a subterranean formation, as a fault, in which a geological fault exists at the pixel location, or a non-fault in which a geological fault does not exist at the pixel location. Other convolutional neural networks may consider pixel-level accuracy but may ignore a global-level feature identification, which can result in a low resolution output. Seismic data from the subterranean formation can be considered as an input for a convolutional neural network-based fault identification or characterization process. Accuracy of the convolutional neural network output can be improved by augmenting the seismic data by flipping it upside-down or by a degree of rotation. In some examples, flipping the seismic data upside-down or rotating the data by the degree can involve one or more dilated convolutions. In other examples, using a deep learning model that includes the dilation module for geological fault characterization can allow less computer memory to be used. For instance, the deep learning model can use less computer memory than an amount of computer memory used by a model that does not include a dilation module.

Dual-channel data can be considered as inputs to a trained convolutional neural network model. The dual-channel data can combine seismic data and one or more seismic attributes such as discontinuity-along-dip or other suitable seismic attributes. Seismic attributes can include data parameters extracted from or derived from the seismic data. The seismic attributes can be used to analyze and enhance a quality of geological or geophysical interpretations such as geological fault interpretation. The seismic attributes can be derived from the seismic data by analyzing the seismic data in a moving one-dimensional window, a two-dimensional window, or a three-dimensional window. The seismic data analysis can, for example, utilize one or more of a frequency parameter, a density parameter, an amplitude parameter, a thermal parameter, a radioactivity parameter, an absorption parameter, and other subterranean formation parameters. The convolutional neural network, or other similar deep learning neural network, can be trained utilizing the seismic data and the seismic attributes, for example, using multi-channels for the convolutional neural network. The seismic attributes can be considered as a channel to feed to the input layer of the convolutional neural network.

The combination of the seismic data and a derived seismic attribute, such as the discontinuity-along-dip, can be used as dual-channel training data for training the convolutional neural network, which can be characterized by an improved accuracy by using the dual-channel training data. During training, the seismic attributes can serve as a guide to provide finer structure information where the seismic data can present such information as noise. The seismic attributes can be assigned an importance coefficient to assist in weighting the value of a respective seismic attribute. In addition, each importance coefficient can be correlated with a standard deviation to provide additional information for the convolutional neural network training. The seismic attributes can be used to identify discontinuous structures and represent the continuity of amplitude events in order to provide additional structural information.

Additionally, a set of dilated convolution layers having different dilation rates can be included in the convolutional neural network for enhancing a feature map and for providing a more accurate geological fault identification or characterization output. For example, the convolutional neural network can include a dilation module that can include six dilated convolution layers and a stacking layer that can stack the dilated convolution layers. In some examples, implementing a series of multi-scale aggregated dilated convolution layers can enhance a receptive field of the subterranean formation to identify more features or geological faults during a geological fault identification or characterization process compared to a geological fault identification or characterization process that does not use the dilated convolution layers.

The subterranean formation can include geological faults, which can be considered or function as sealing surfaces that trap or otherwise retain hydrocarbons and can form reservoir zones. Successful hydrocarbon exploration can involve identifying the location of the geological faults. A convolutional neural network can be used to extract geological fault features from seismic data about the subterranean formation. A standard convolutional neural network, or a convolutional neural network that does not include a dilation module, may consider pixel-level accuracy, but may ignore global-level feature identification, which can cause low resolution in a feature map output of the convolutional neural network. The standard convolutional neural network can include various convolution layers. Dilated convolution layers, and other suitable layers for a convolutional neural network, can be added to the standard convolutional neural network for improving accuracy and resolution of an output of the convolutional neural network. Various dilation rates can be applied to each dilated convolution layer added to the standard convolutional neural network to determine or identify seismic receptive fields associated with the subterranean formation. The convolutional neural network that includes the dilated convolution layers can identify more local features and global features of the seismic data for improving the accuracy of the fault identification process.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example of a geological area of interest 100 that includes a system for facilitating hydrocarbon exploration according to one example of the present disclosure. The geological area of interest 100 can include a subterranean formation 102 formed from various earth strata 104a-h. The subterranean formation 102 can include various geological bodies, such as a salt body 108 that includes salt, an oil body 110 that includes oil, a gas body 112 that includes gas, and a water body 114 that includes water. In some examples, the subterranean formation 102 may include more, fewer, or different types of earth strata and geological bodies. Additionally, the subterranean formation 102 can include a geological fault 115 that can represent a discontinuity in the subterranean formation 102. In some examples, the geological fault 115 can represent a discontinuity with respect to the earth strata 104 and can separate two or more geological bodies. As illustrated, the subterranean formation 102 includes one geological fault 115, but the subterranean formation 102 can include other suitable amounts of geological faults.

At least one portion of the system can be positioned at the surface 120 of the subterranean formation 102 for detecting or otherwise characterizing geological faults in the subterranean formation 102. For example, the system can include a signal source 116 and sensors 118a-d, which, for example, can be used to detect and receive seismic data about the subterranean formation 102. Examples of the signal source 116 can include a vibration unit, an explosive charge, or other suitable type of signal source 116, and examples of the sensors 118a-d can include geophones, hydrophones, or other suitable types of sensors 118. The signal source 116 can emit one or more waves into a target area of the subterranean formation 102. In the example shown in FIG. 1, the waves are represented by black arrows and the target area is the portion of the subterranean formation 102 positioned below sensors 118a-d. The waves can reflect off the geological bodies, the geological fault 115, or other suitable components of the subterranean formation 102 and return to the sensors 118. The sensors 118 can detect the reflected waves and provide corresponding seismic data to a computing device 122, which may be included in the system.

As one particular example, the signal source 116 can include a vibration unit and the sensors 118 can include geophones. The vibration unit can emit vibrations that propagate through the target area of the subterranean formation 102, reflect off the geological bodies, the fault, or other suitable components of the subterranean formation 102, and return to the geophones. The geophones can receive the reflected vibrations and generate seismic data based on the reflected vibrations. The seismic data can include reflection data, refraction data, shear wave data, and a set of seismic pixels that can correspond to geographic locations with respect to the subterranean formation 102. The seismic data can include other suitable types of data relating to the subterranean formation 102. The geophones can then transmit the respective seismic data to the computing device 122. Additionally or alternatively, the computing device 122 can receive the seismic data via other suitable processes and equipment.

The computing device 122 can include a model 124 that can receive seismic data as input and provide an output that can characterize the geological fault 115. For example, the output can indicate the location, size, depth, or other suitable information relating to the geological fault 115. In some examples, the output can include an indication of whether a geological fault exists at each seismic pixel of the set of seismic pixels. The model 124 can include a trained machine-learning model, such as a trained deep learning or convolutional neural network. In some examples, the model 124 can include a dilation module that can allow operations involving dilated convolutions to be performed with respect to the seismic data. For example, the dilation module can rotate or flip the seismic data for retaining resolution of the seismic data.

The computing device 122 can execute the model 124 with respect to the seismic data to derive one or more seismic attributes associated with the seismic data. The seismic attributes can include discontinuity-along-dip, relative directional amplitude change, sweet, curvature, and other suitable types of seismic attributes. The model 124 can additionally determine parameterized results by analyzing the seismic data and the seismic attributes. The determined parameterized results can be used to determine and output data or other types of information for characterizing the geological fault 115. For example, the computing device 122 can output probabilities of the geological fault 115 being at one or more locations in the subterranean formation 102.

While FIG. 1 depicts an exemplary system that includes certain components (e.g., the signal source 116, the sensors 118, and the computing device 122), other examples may include more, fewer, or different components. For instance, different examples may involve the computing device 122 receiving seismic data from a remote computing device via a network, such as the Internet. The computing device 122 can receive the seismic data from the remote computing device additionally or alternatively to receiving seismic data from the sensors 118. And, in some examples, the computing device 122 may be positioned offsite, rather than proximate to the target area of the subterranean formation 102.

Figure 2:
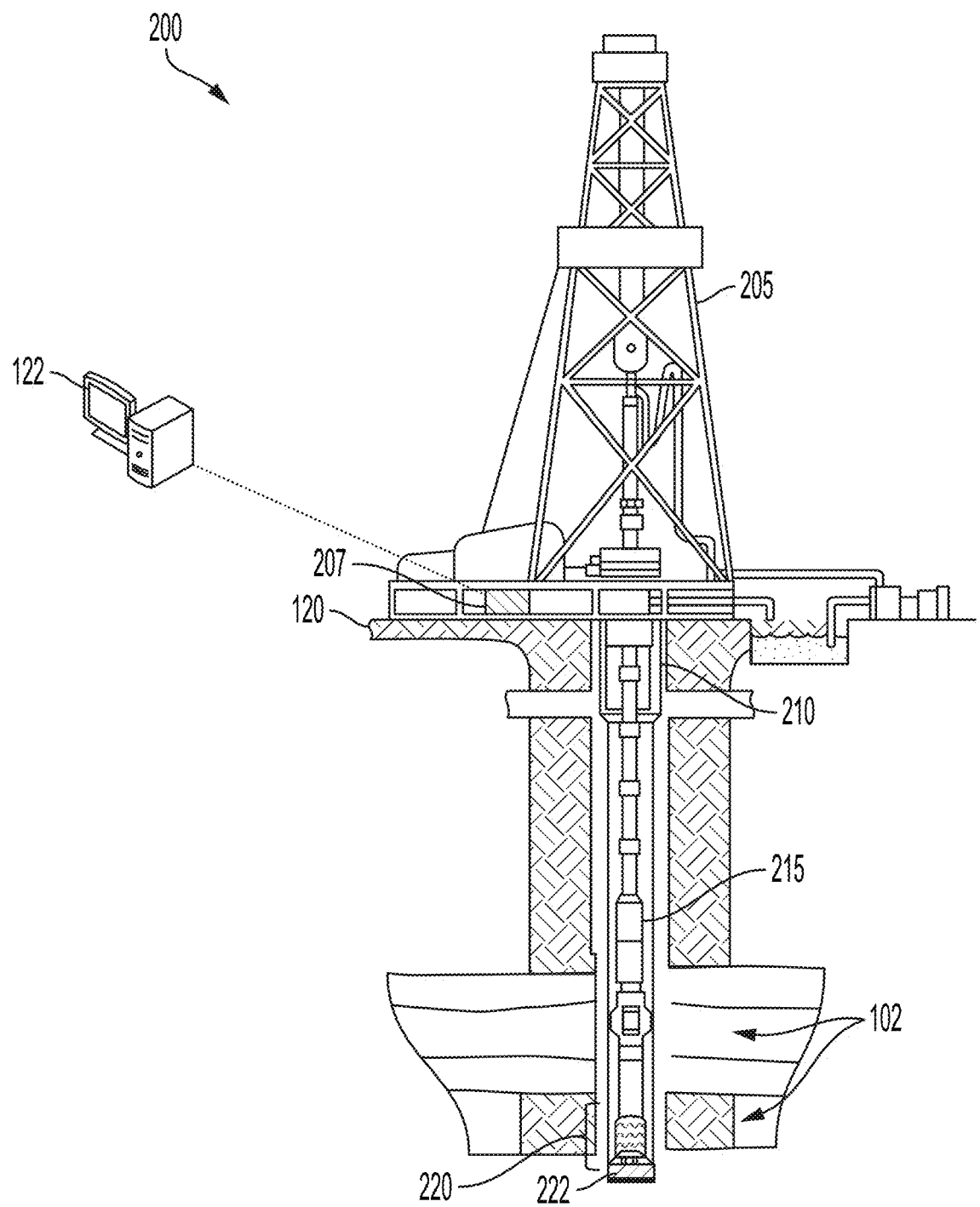
FIG. 2 is a schematic of a well system that can be developed using seismic data fault characterization according to one example of the present disclosure.

FIG. 2 is a schematic of a well system 200 that can be developed using seismic data fault characterization according to one example of the present disclosure. The well system 200 can be or can include a drilling system, an extraction system, a production system, a wireline system with a pump, a combination thereof, or other suitable hydrocarbon well systems. In some examples, the well system 200 can be developed using the system, or using results output by the system, for characterizing the geological fault 115 and described with respect to FIG. 1. The well system 200 can include a derrick 205, a well site controller 207, and a computing device 122. The well site controller 207 can include a processor and a memory, and the well site controller 207 can be configured to direct operation of the well system 200. The derrick 205 can be located at the surface 120.

A borehole 210 can extend below the derrick 205, and a drill string 215 can be inserted into, or otherwise be included in, the borehole 210. Downhole tools 220 can be located at the bottom of the drill string 215. The downhole tools 220 can include various downhole tools and bottom hole assemblies (BHA), such as a drilling bit 222 and various seismic telemetry devices. Other components of the downhole tools 220 can be present, such as a local power supply (e.g., a generator), batteries, capacitors, telemetry systems, a transceiver, a control system, or other suitable components. The borehole 210 can be surrounded by the subterranean formation 102.

The well site controller 207, or a computing device 122 communicatively coupled to the well site controller 207, can be utilized to communicate with downhole tools 220, for example sending or receiving seismic data correlated to the subterranean formation 102, telemetry, data, instructions, or other suitable information. The computing device 122 can be positioned proximate to the well site controller 207 or can be positioned a distance away, such as in a cloud environment, a data center, a lab, a corporate office, or other suitable remote location. The computing device 122 can be a laptop, smartphone, PDA, server, desktop computer, cloud computing system, or other suitable computing system capable of performing the operations described herein. Well site operators, engineers, and other personnel can also send and receive the seismic data, telemetry, data, instructions, and other information by various suitable means with the computing device 122, the well site controller 207, a combination thereof, or other suitable communication component.

The seismic data collected by the downhole tools 220 can be used as the seismic data inputs into a system for characterizing geological faults 115 with respect to the subterranean formation 102. The seismic data can be received from other suitable sources such as other sensors located within the borehole 210 or at the surface 120, a database, cloud storage, server, other data storage devices, and the like. The system for characterizing geological faults can be executed on the computing device 122, the well site controller 207, or other suitable computing system or device associated with the well system 200. The resulting fault characterizations can be utilized to modify the well operation plan and drilling plan for the well system 200.

Figure 3:
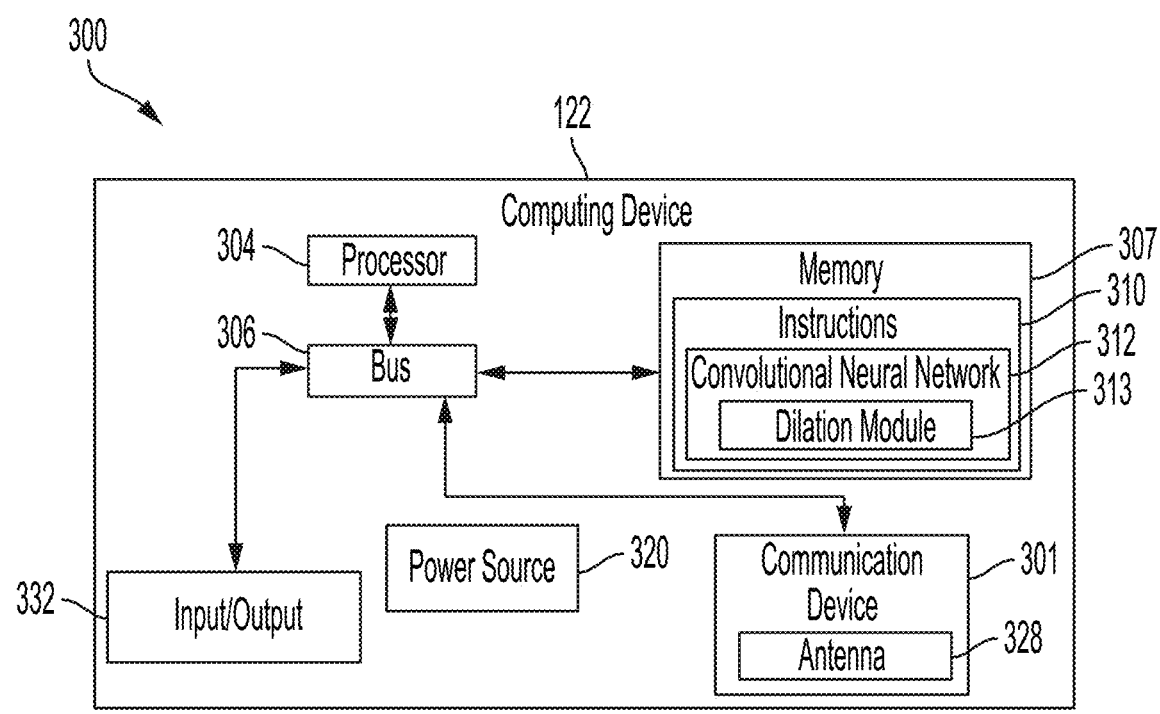
FIG. 3 is a block diagram of a computing system for identifying fault locations using a deep learning neural network that includes a dilation module according to one example of the present disclosure.

FIG. 3 is a block diagram of a computing system 300 for identifying fault locations using a deep learning neural network that includes a dilation module according to one example of the present disclosure. The components shown in FIG. 3, such as the processor 304, memory 307, power source 320, communications device 301, and the like, may be integrated into a single structure such as within a single housing of a computing device 122. Alternatively, the components shown in FIG. 3 can be distributed from one another and in electrical communication with each other.

The computing system 300 may include the computing device 122. The computing device 122 can include a processor 304, a memory 307, and a bus 306. The processor 304 can execute one or more operations for training and applying a convolutional neural network 312 to seismic data and derived seismic attributes with respect to a subterranean formation 102. The convolutional neural network 312 can include a dilation module 313, which can include a set of dilated convolution layers and one or more stacking layers. The processor 304 can execute instructions stored in the memory 307 to perform the operations. The processor 304 can include one processing device or multiple processing devices or cores. Non-limiting examples of the processor 304 include a Field-Programmable Gate Array ("FPGA"), an application-specific integrated circuit ("ASIC"), a microprocessor, etc.

The processor 304 can be communicatively coupled to the memory 307 via the bus 306. The non-volatile memory 307 may include any type of memory device that retains stored information when powered off. Non-limiting examples of the memory 307 may include EEPROM, flash memory, or any other type of non-volatile memory. In some examples, at least part of the memory 307 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 307 can include computer program instructions 310 for training and applying the convolutional neural network 312. For example, the instructions 310 can include the convolutional neural network 312, which can include the dilation module 313 that can be executed by the processor 304 for causing the processor 304 to output feature maps for identifying or otherwise characterizing geological faults in the subterranean formation 102. The convolutional neural network 312 can be trained using seismic data, derived seismic attributes, a combination thereof, or other suitable training data associated with the subterranean formation 102. For example, the convolutional neural network 312 can be trained using a dual-channel training input that includes the seismic data and the derived seismic attributes such as discontinuity-along-dip. Additionally, the convolutional neural network 312 can perform operations to output feature maps for identifying or characterizing geological faults in the subterranean formation 102. For example, the computing device 122 can receive seismic data that can correspond to the subterranean formation 102. The computing device 122 can use the seismic data to derive one or more seismic attributes such as discontinuity-along-dip. The computing device 122 can use the dilation module 313 to determine parameterized values by analyzing the seismic data and the seismic attributes. The computing device 122 can calculate and output probabilities of a geological fault existing at locations with respect to the subterranean formation 102. The computing device 122 can perform other suitable operations relating to hydrocarbon exploration with respect to the subterranean formation 102.

The computing device 122 can include a power source 320. The power source 320 can be in electrical communication with the computing device 122 and the communications device 301. In some examples, the power source 320 can include a battery or an electrical cable (e.g., a wireline). The power source 320 can include an AC signal generator. The computing device 122 can operate the power source 320 to apply a transmission signal to the antenna 328 to generate electromagnetic waves that convey data relating to the subterranean formation 102, the convolutional neural network 312, etc., to other systems. For example, the computing device 122 can cause the power source 320 to apply a voltage with a frequency within a specific frequency range to the antenna 328. This can cause the antenna 328 to generate a wireless transmission. In other examples, the computing device 122, rather than the power source 320, can apply the transmission signal to the antenna 328 for generating the wireless transmission.

In some examples, a subset of the communications device 301 can be implemented in software. For example, the communications device 301 can include additional instructions stored in memory 307 for controlling functions of the communication device 301. The communications device 301 can receive signals from remote devices and transmit data to remote devices. For example, the communications device 301 can transmit wireless communications that are modulated by data via the antenna 328. In some examples, the communications device 301 can receive signals (e.g. associated with data to be transmitted) from the processor 304 and amplify, filter, modulate, frequency shift, or otherwise manipulate the signals. In some examples, the communications device 301 can transmit the manipulated signals to the antenna 328. The antenna 328 can receive the manipulated signals and responsively generate wireless communications that carry the data.

The computing device 122 can additionally include an input/output interface 332. The input/output interface 332 can include or otherwise connect to a keyboard, pointing device, display, and other computer input/output devices. An operator may provide input using the input/output interface 332. Data, such as seismic data, feature maps, identified geological faults, etc., relating to the subterranean formation 102 can be displayed to an operator or other suitable individual via a display that is connected to or is part of the input/output interface 332. The displayed values can be displayed to the operator, or to a supervisor of a hydrocarbon exploration operation associated with the subterranean formation 102. Additionally, the displayed values can advise the operator or the supervisor about the exploration operation for making adjustments to the exploration operation, or other suitable operation with respect to the subterranean formation 102.

Figure 4:
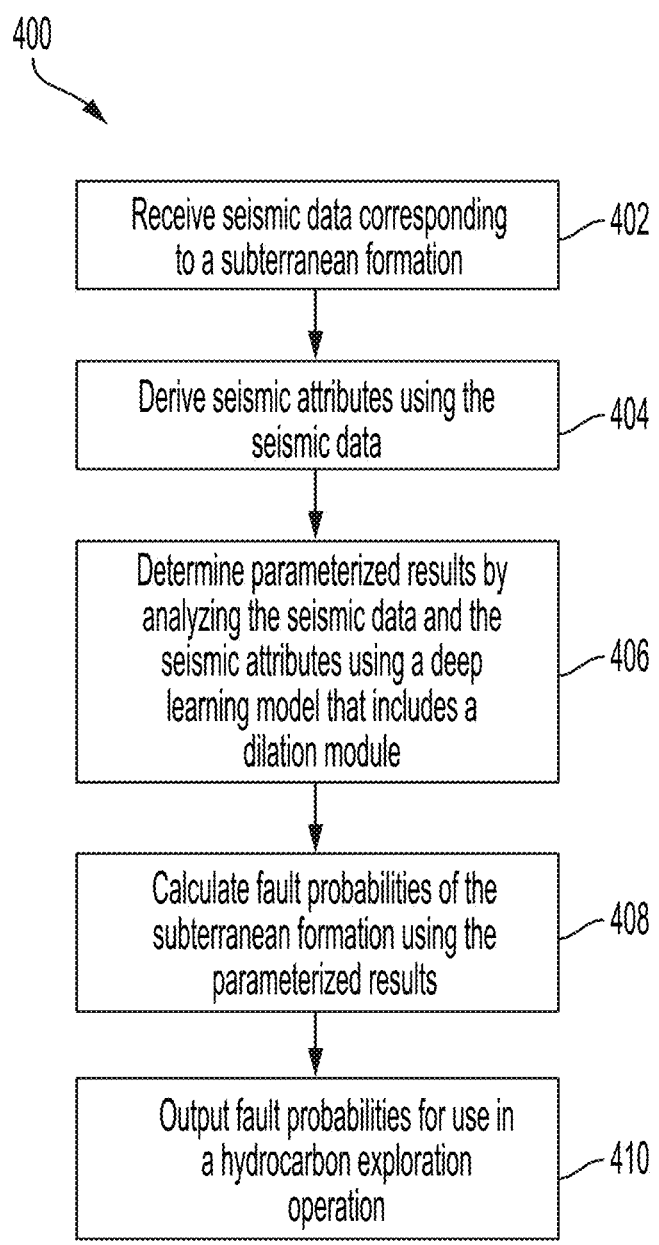
FIG. 4 is a flow chart of a process to characterize geological faults with respect to a subterranean formation according to one example of the present disclosure.

FIG. 4 is a flow chart of a process 400 to characterize geological faults with respect to a subterranean formation 102 according to one example of the present disclosure. At block 402, the computing device 122 receives seismic data that correlates to a subterranean formation 102. The seismic data can include reflection seismic data, refraction seismic data, shear wave seismic data, a set of seismic pixels corresponding to geographic locations with respect to the subterranean formation 102, or a combination thereof. The seismic data can include other suitable data that can characterize the subterranean formation 102. Sensors, such as the sensors 118, sensors included in the downhole tools 220, or other suitable sensors, can detect the seismic data relating to the subterranean formation 102 and can transmit the seismic data to the computing device 122. In some examples, the computing device 122 can receive the seismic data via other suitable techniques.

At block 404, the computing device 122 derives seismic attributes, which can include discontinuity-along-dip, from the seismic data received with respect to the block 402. The computing device 122 can use the received seismic data to derive the discontinuity-along-dip and other suitable seismic attributes. Discontinuity-along-dip can indicate whether a discontinuity is in a direction of a geological dip of the subterranean formation 102. For example, one or more discontinuities with respect to the subterranean formation 102 can follow a direction of the geological dip with respect to a location of the subterranean formation 102. In this example, the discontinuity-along-dip value can indicate the presence of one or more geological faults with respect to the location of the subterranean formation 102. The computing device 122 can derive the seismic attributes from the seismic data by analyzing the seismic data in a moving one-dimensional window, a two-dimensional window, or a three-dimensional window. The seismic attributes can include discontinuity-along-dip, relative directional amplitude change, sweet, curvature, or other suitable types of seismic attributes.

In some examples, the seismic data and the seismic attributes can be used to train a deep learning model such as the convolutional neural network 312. For example, the seismic data and the seismic attributes can be input into the convolutional neural network 312 as a dual-channel training input. The convolutional neural network 312 can additionally be trained using historical data about the subterranean formation 102. For example, historical data that includes known locations of one or more geological faults 115 can be used to train the convolutional neural network 312. In this example, training the convolutional neural network 312 can involve mapping the dual-channel input, which includes the seismic data and the seismic attributes, to the historical data. Additionally or alternatively, the convolutional neural network 312 can be trained using other suitable training operations.

At block 406, the computing device 122 determines parameterized results by analyzing the seismic data and the set of seismic attributes using a deep learning neural network that can include a dilation module 313. The deep learning neural network can be or can otherwise include a convolutional neural network 312. The computing device 122 can use the convolutional neural network 312 to parameterize the seismic data, the seismic attributes, a combination thereof, or other suitable input to the convolutional neural network 312. For example, the convolutional neural network 312 can be applied to the seismic data and to the seismic attributes to determine parameterized results that can indicate geological fault probabilities. The parameterized results can be results of a set of conventional convolution operations and dilated convolutional operations performed with respect to the seismic data and the seismic attributes. In some examples, the computing device 122 can parameterize the seismic data and the seismic attributes before applying the convolutional neural network 312 to the seismic data and the seismic attributes.

In some examples, the computing device 122 can analyze the seismic data, the discontinuity-along-dip, and other suitable seismic attributes to determine parameterized results. The parameters of the parameterized results can be defined or otherwise determined by the computing device 122 and can include a frequency parameter, a density parameter, an amplitude parameter, a thermal parameter, a radioactivity parameter, an absorption parameter, or other suitable subterranean formation parameters. The computing device 122 can utilize the parameters to analyze the seismic data and seismic attributes for determining the parameterized results, which can be used to characterize geological faults 115 with respect to the subterranean formation 102. In some examples, the parameterized results can be results of a set of dilated convolution operations, a set of conventional convolution operations, a combination thereof, or other suitable operations performed by the convolutional neural network 312. The parameterized results can be expressed with respect to the parameters determined by the computing device 122.

In some examples, the computing device 122 can apply the convolutional neural network 312, the dilation module 313, or a combination thereof to an input convolution matrix, or convolution kernel. The convolution matrix can include a set of pixels, such as geological pixels, and the dilation module 313 can include a set of dilated convolution layers, each dilated layer of which including a different dilation factor. The dilation factor can indicate a size of the gaps between pixels of the set of pixels of the convolution matrix for an associated dilated convolution operation.

The computing device 122 can use the convolutional neural network 312, which can include the dilation module 313, to analyze the seismic data and the seismic attributes. For example, the computing device 122 can apply the convolutional neural network 312 to the seismic data and the seismic attributes. The seismic data and the seismic attributes can accordingly undergo various convolutional operations. For example, the dilation module 313 can perform one or more dilated convolutions on the seismic data and the seismic attributes. The dilated convolutions can correspond to dilated convolution layers that can be included in the dilation module 313. For example, the dilation module 313 can include six dilated convolution layers that can each be characterized by a different dilation factor. Each dilated convolution layer can perform a dilated convolution on the seismic data and the seismic attributes, and a stacking layer, which can be included in the dilation module 313, can stack the dilate convolution layers or results of the dilated convolutions. The dilation module 313 can include other suitable amounts of dilated convolution layers such as between one and 20 dilated convolution layers. In some examples, the dilation module 313 can rotate, flip, or perform other suitable operations on the seismic data and the seismic attributes for retaining resolution of the input data.

At block 408, the computing device 122 calculates one or more fault probabilities of the subterranean formation 102 using the parameterized results. The fault probabilities can include probabilities associated with one or more locations of the subterranean formation 102, and the fault probabilities can indicate how likely a geological fault 115 exists at the one or more locations. In some examples, the fault probabilities can be binary in which the fault probabilities can include either an indication that a geological fault 115 exists at a particular location with respect to the subterranean formation 102 or an indication that the geological fault 115 does not exist at the particular location with respect to the subterranean formation 102. The computing device 122 can apply the parameterized results to the subterranean formation 102 for determining whether one or more geological faults exist in the subterranean formation 102. For example, the computing device 122 can apply the parameterized results to the set of geological pixels included in the received seismic data and associated with different geographic locations corresponding to the subterranean formation 102. The computing device 122 can output, for one or more of the geological pixels, probabilities that a geological fault exists at the geographic location of the geological pixels. In some examples, the computing device 122 can use semantic segmentation with respect to the geological pixels to output a binary indicator of whether a geological fault exists at the pixels. For instance, the computing device 122 can output a "fault" or a "non-fault" indicator for each geological pixel of the set of geological pixels.

In some examples, the computing device 122 can use the convolutional neural network 312, or other suitable model, to perform semantic image segmentation. The computing device 122 can perform the semantic image segmentation on a set of geological pixels, such as the set of geological pixels received with the seismic data, to indicate a class represented by each geological pixel of the set of geological pixels. For example, the class can include a geological fault, not a geological fault, or other suitable class with respect to the set of geological pixels. The computing device 122 can use the fault probabilities to assign a class to each geological pixel based on whether the fault probabilities indicate that a geological fault 115 exists at each geological pixel.

At block 410, the computing device 122 outputs the fault probabilities for use in a hydrocarbon exploration operation. The fault probabilities can also be used for other suitable operations with respect to the subterranean formation 102 such as a drilling operation, etc. The output fault probabilities can be used to advise operators or supervisors of the hydrocarbon operation regarding whether to form an exploration well at one or more locations of the subterranean formation. The output fault probabilities can additionally be used for other suitable operations with respect to the hydrocarbon exploration operation.

Figure 5:
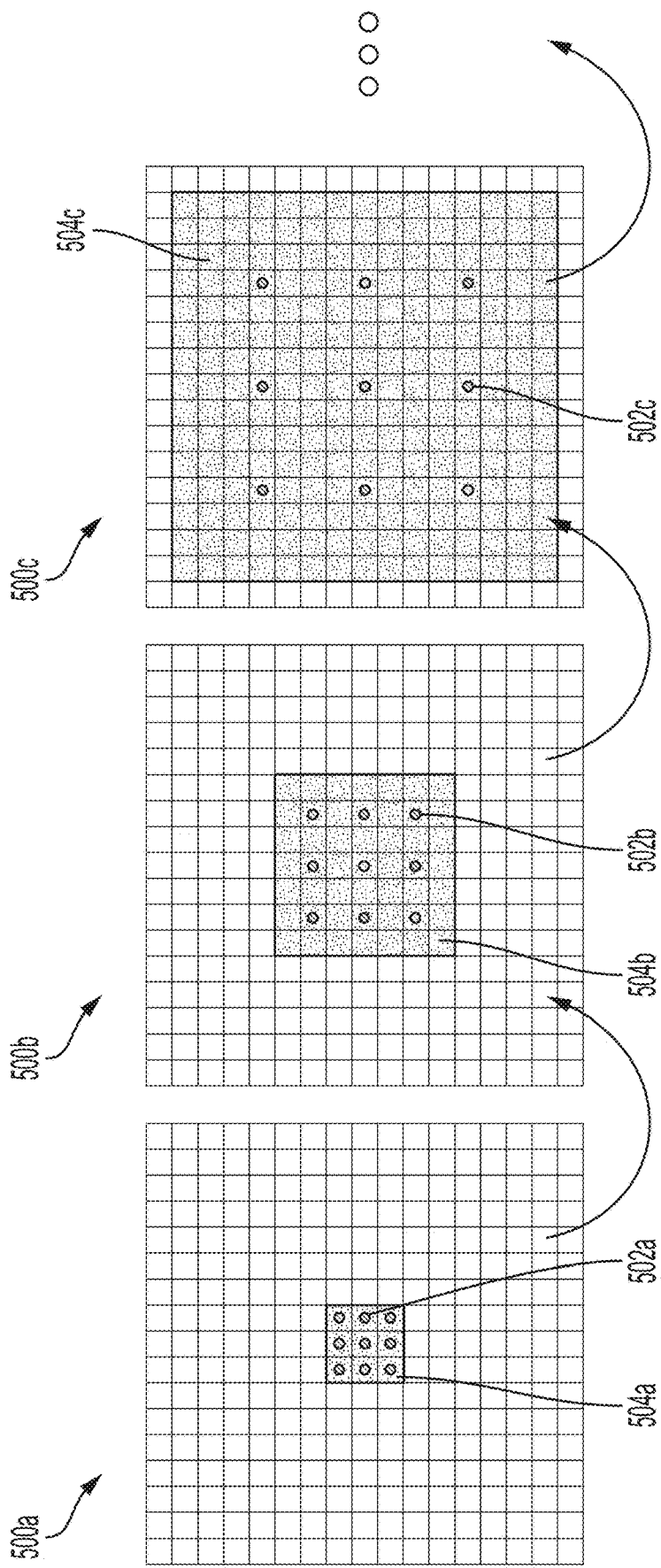
FIG. 5 is a diagram of a set of dilated convolution operations that include different dilation rates according to one example of the present disclosure.

FIG. 5 is a diagram of a set of dilated convolution operations 500a-c that include different dilation rates according to one example of the present disclosure. The dilated convolution operations 500 can be applied to data associated with the subterranean formation 102. For example, the dilated convolution operations 500 can be applied to the seismic data and the seismic attributes, such as discontinuity-along dip, associated with the subterranean formation 102. The dilated convolution operation 500a can include a dilation rate of one (e.g., a conventional convolution operation), the dilated convolution operation 500b can include a dilation rate of two, and the dilated convolution operation 500c can include a dilation rate of four. The dilated convolution operations 500 can be included in the dilation module 313 in order of increasing dilation rate or in other suitable orderings. In some examples, the dilated convolution operations 500 can include other suitable dilation rates for allowing the dilation module 313 to perform dilated convolutions.

The dilated convolution operations 500 can include different dilation kernels and different receptive fields associated with the corresponding dilated convolution operation 500. For example, the dilated convolution operation 500a can include a convolution kernel 502a, and a receptive field 504a. The convolution kernel 502a can be 3×3×3 with respect to spatial dimensions and, in some examples, can be a convolution matrix. The convolution matrix can include data about the subterranean formation 102 such as the seismic data, the seismic attributes, or other suitable data about the subterranean formation 102. The receptive field 504a can be a spatial area over which the dilated convolution operation 500a can capture data. The receptive field 504a can depend, either directly or indirectly, on the dilation rate associated with the dilated convolution operation 500a. For example, since the dilation rate of the convolution operation 500a is one, the receptive field 504a of the dilated convolution operation 500a may include the convolution kernel 502a.

A receptive field 504b of the dilated convolution operation 500b may be larger than the receptive field 504a since the dilation rate of the dilated convolution operation 500b is larger than the dilation rate of the dilated convolution operation 500a. For example, the receptive field 504b can extend at least one unit away in each direction from a convolution kernel 502b. Additionally, the receptive field 504c of the dilated convolution operation 500c may be larger than the receptive field 504b since the dilation rate of the dilated convolution operation 500c is larger than the dilation rate of the dilated convolution operation 500b. For example, the receptive field 504c can extend at least three units away in each direction from a convolution kernel 502c.

Figure 6:
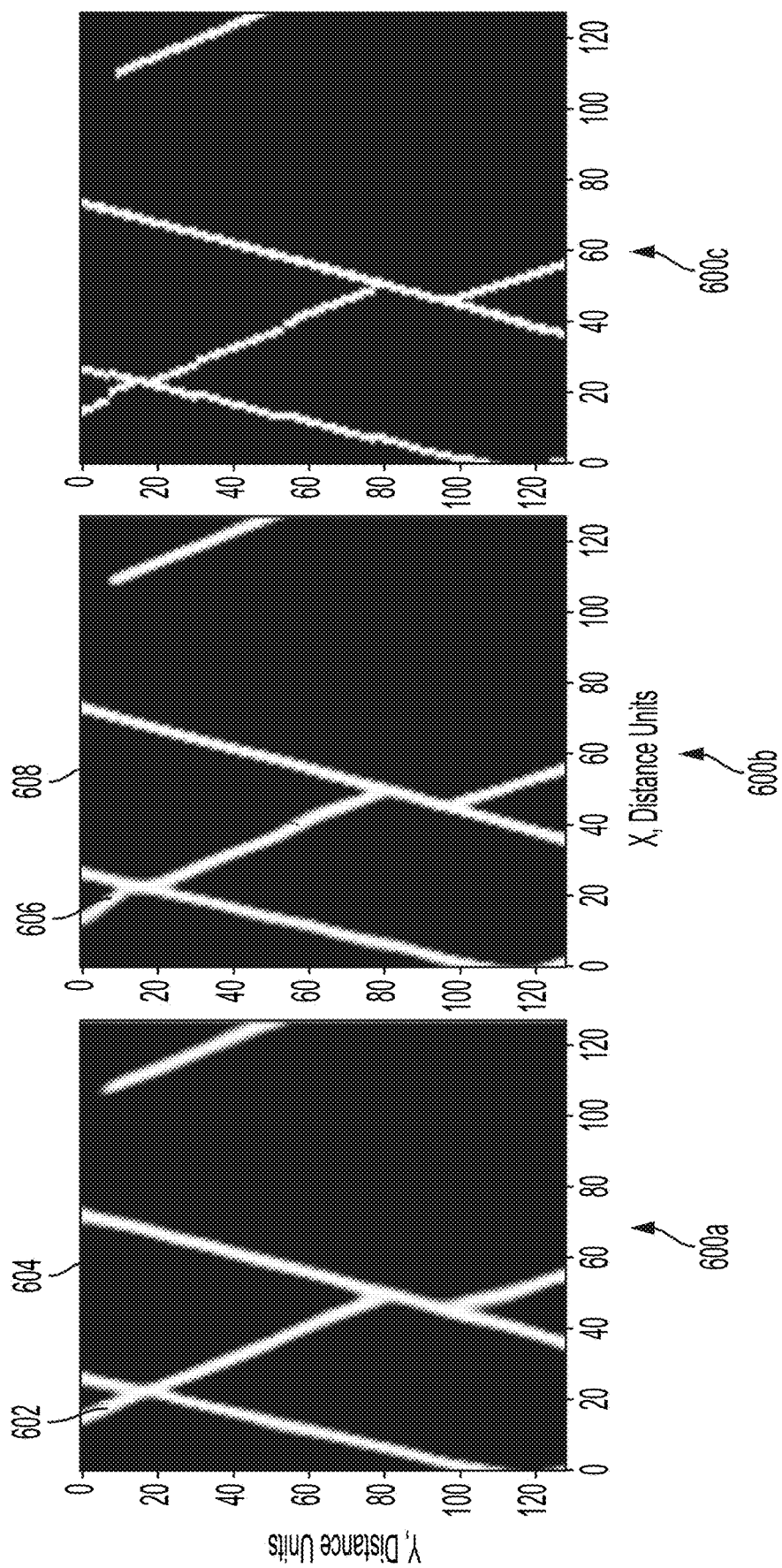
FIG. 6 is a set of output plots for characterizing geological faults with respect to a subterranean formation according to one example of the present disclosure.

FIG. 6 is a set of output plots 600a-c for characterizing geological faults with respect to a subterranean formation 102 according to one example of the present disclosure. The output plot 600a can be generated by other models that attempt to characterize geological faults with respect to the subterranean formation 102. The output plot 600b can be generated by the computing device 122 using the convolutional neural network 312, which includes the dilation module 313, for characterizing geological faults with respect to the subterranean formation 102. The output plot 600c can be a ground truth plot that can represent exact locations of geological faults with respect to the subterranean formation 102.

As illustrated, the output plot 600a includes a first cross-feature 602 and an offset location 604. The first cross-feature 602 and the offset location 604 may be identified by other models as being associated with a geological fault 115. Additionally, as illustrated, the output plot 600b includes a second cross-feature 606 and a straight location 608. The second cross-feature 606 and the straight location 608 may be identified by the computing device 122 as being associated with a geological fault. The first cross-feature 602 and the second cross-feature 606 may be offset from one another. The output plot 600c can indicate that the second cross-feature 606 is the more accurate feature such that a geological fault 115 exists at the geographic location of the second cross-feature 606. Additionally, the offset location 604 and the straight location 608 may represent a geological fault 115 that exists at or near a location of the offset location 604 or the straight location 608. The output plot 600c illustrates the straight location 608, which indicates that the geological fault 115 exists at the straight location 608 instead of the offset location 604. Accordingly, the output plot 600b generated, for example, using the convolutional neural network 312 can be more accurate than the output plot 600a generated, for example, using other models.

Figure 7:
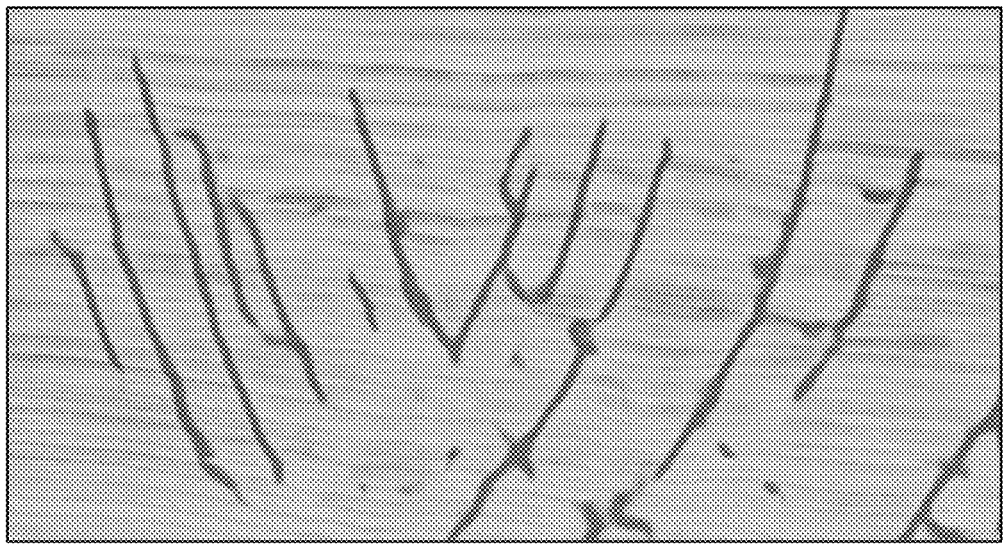
FIG. 7 is a set of output plots for characterizing geological faults with respect to a subterranean formation according to one example of the present disclosure.
Figure 7:
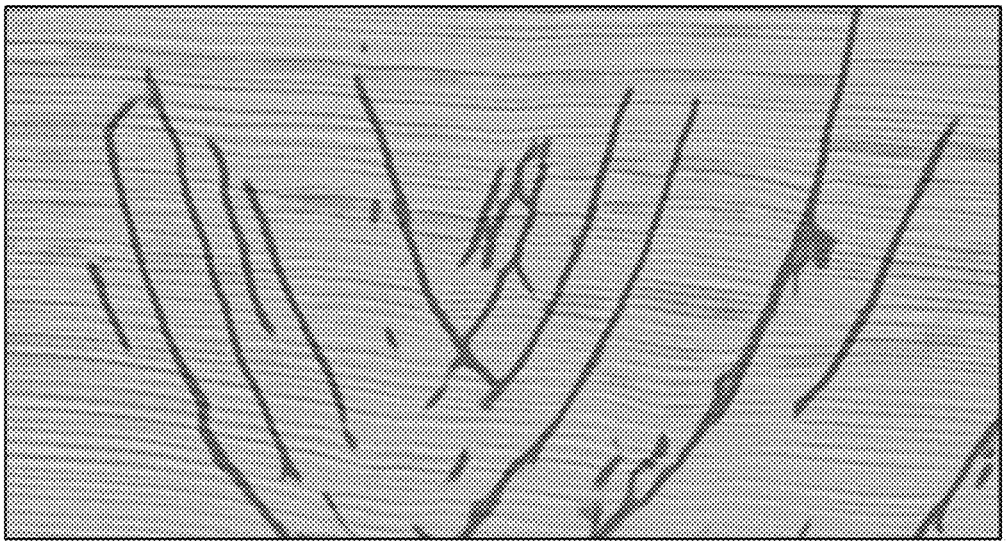

FIG. 7 is a set of output plots 700a-b for characterizing geological faults with respect to a subterranean formation 102 according to one example of the present disclosure. The output plot 700a can be generated by other models that attempt to characterize geological faults with respect to the subterranean formation 102. The output plot 700b can be generated by the computing device 122 using the convolutional neural network 312, which includes the dilation module 313, for characterizing geological faults with respect to the subterranean formation 102.

As illustrated, the output plots 700a-b indicate geographic locations at which one or more geological faults 115 can exist. The output plot 700a can include indications that may be considered fuzzy, low-resolution, inaccurate, or otherwise low quality. The output plot 700b, generated using the convolutional neural network 312, can include indications that may be considered sharp, high-resolution, accurate, or otherwise high quality. Additionally, the output plot 700b can include more indications, compared to the indications of the output plot 700a, of geographic locations at which the geological faults exist with respect to the subterranean formation 102.

In some aspects, systems, methods, and non-transitory computer-readable mediums for deep learning model with dilation module for fault characterization are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving seismic data correlating to a subterranean formation; deriving a set of seismic attributes from the seismic data, the set of seismic attributes including discontinuity-along-dip; determining parameterized results by analyzing the seismic data and the set of seismic attributes using a deep learning neural network, wherein the deep learning neural network includes a dilation module; determining one or more fault probabilities of the subterranean formation using the parameterized results; and outputting the one or more fault probabilities for use in a hydrocarbon exploration operation.

Example 2 is the system of example 1, wherein the dilation module comprises a set of dilated convolution layers, wherein the deep learning neural network is a convolutional neural network, and wherein the convolutional neural network comprises: a plurality of convolution layers, wherein: a first subset of the plurality of convolution layers are before the dilation module; and a second subset of the plurality of convolution layers are after the dilation module; a plurality of pooling layers interspersed between the first subset of the plurality of convolution layers; and a plurality of upsampling layers interspersed between the second subset of the plurality of convolution layers.

Example 3 is the system of any of examples 1-2, wherein the dilation module is applicable to an input convolution matrix that includes a set of pixels, and wherein each dilated convolution layer of the set of dilated convolution layers includes a different dilation factor that defines a different sized gap between adjacent pixels of the set of pixels of the input convolution matrix for an associated dilated convolution operation.

Example 4 is the system of example 1, wherein the operation of determining parameterized results by analyzing the seismic data and the set of seismic attributes using a deep learning neural network includes performing a set of convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

Example 5 is the system of example 1, wherein the deep learning neural network has been trained using a dual-channel input and historical data, wherein the dual-channel input includes the seismic data and the set of seismic attributes, and wherein the historical data includes one or more known locations of geological faults.

Example 6 is the system of example 1, wherein the seismic data includes seismic reflection data, seismic refraction data, seismic shear data, and a plurality of geological pixels that correspond to geographic locations with respect to the subterranean formation, and wherein the set of seismic attributes include discontinuity-along-dip, relative directional amplitude change, sweet, and curvature.

Example 7 is the system of any of examples 1 and 6, wherein the operation of determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

Example 8 is a method comprising: receiving seismic data correlating to a subterranean formation; deriving a set of seismic attributes from the seismic data, the set of seismic attributes including discontinuity-along-dip; determining parameterized results by analyzing the seismic data and the set of seismic attributes using a deep learning neural network, wherein the deep learning neural network includes a dilation module; determining one or more fault probabilities of the subterranean formation using the parameterized results; and outputting the one or more fault probabilities for use in a hydrocarbon exploration operation.

Example 9 is the method of example 8, wherein the dilation module comprises a set of dilated convolution layers, wherein the deep learning neural network is a convolutional neural network, and wherein the convolutional neural network comprises: a plurality of convolution layers, wherein: a first subset of the plurality of convolution layers are before the dilation module; and a second subset of the plurality of convolution layers are after the dilation module; a plurality of pooling layers interspersed between the first subset of the plurality of convolution layers; and a plurality of upsampling layers interspersed between the second subset of the plurality of convolution layers.

Example 10 is the method of any of examples 8-9, wherein determining parameterized results by analyzing the seismic data and the set of seismic attributes using a deep learning neural network includes applying the dilation module to an input convolution matrix that includes a set of pixels, and wherein each dilated convolution layer of the set of dilated convolution layers includes a different dilation factor that defines a different sized gap between adjacent pixels of the set of pixels of the input convolution matrix for an associated dilated convolution operation.

Example 11 is the method of example 8, wherein determining parameterized results by analyzing the seismic data and the set of seismic attributes using a deep learning neural network includes performing a set of dilated convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

Example 12 is the method of example 8, further comprising training the deep learning neural network using a dual-channel input and historical data, wherein the dual-channel input includes the seismic data and the set of seismic attributes, and wherein the historical data includes one or more known locations of geological faults.

Example 13 is the method of example 8, wherein the seismic data includes seismic reflection data, seismic refraction data, seismic shear data, and a plurality of geological pixels that correspond to geographic locations with respect to the subterranean formation, and wherein the set of seismic attributes include discontinuity-along-dip, relative directional amplitude change, sweet, and curvature.

Example 14 is the method of any of examples 8 and 13, wherein determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

Example 15 is a non-transitory computer-readable medium comprising instructions that are executable by a processing device for causing the processing device to perform operations comprising: receiving seismic data correlating to a subterranean formation; deriving a set of seismic attributes from the seismic data, the set of seismic attributes including discontinuity-along-dip; determining parameterized results by analyzing the seismic data and the set of seismic attributes using a deep learning neural network, wherein the deep learning neural network includes a dilation module; determining one or more fault probabilities of the subterranean formation using the parameterized results; and outputting the one or more fault probabilities for use in a hydrocarbon exploration operation.

Example 16 is the non-transitory computer-readable medium of example 15, wherein the dilation module comprises a set of dilated convolution layers, wherein the deep learning neural network is a convolutional neural network, and wherein the convolutional neural network comprises: a plurality of convolution layers, wherein: a first subset of the plurality of convolution layers are before the dilation module; and a second subset of the plurality of convolution layers are after the dilation module; a plurality of pooling layers interspersed between the first subset of the plurality of convolution layers; and a plurality of upsampling layers interspersed between the second subset of the plurality of convolution layers.

Example 17 is the non-transitory computer-readable medium of any of examples 15-16, wherein the dilation module is applicable to an input convolution matrix that includes a set of pixels, and wherein each dilated convolution layer of the set of dilated convolution layers includes a different dilation factor that defines a different sized gap between adjacent pixels of the set of pixels of the input convolution matrix for an associated dilated convolution operation.

Example 18 is the non-transitory computer-readable medium of example 15, wherein the operation of determining parameterized results by analyzing the seismic data and the set of seismic attributes using a deep learning neural network includes performing a set of dilated convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

Example 19 is the non-transitory computer-readable medium of example 15, wherein the deep learning neural network has been trained using a dual-channel input and historical data, wherein the dual-channel input includes the seismic data and the set of seismic attributes, and wherein the historical data includes one or more known locations of geological faults.

Example 20 is the non-transitory computer-readable medium of example 15, wherein the seismic data includes seismic reflection data, seismic refraction data, seismic shear data, and a plurality of geological pixels that correspond to geographic locations with respect to the subterranean formation, wherein the set of seismic attributes include discontinuity-along-dip, relative directional amplitude change, sweet, and curvature, and wherein the operation of determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a non-transitory computer-readable medium comprising instructions that are executable by the processor to cause the processor to perform operations comprising:
   receiving seismic data correlating to a subterranean formation;
   deriving a set of seismic attributes from the seismic data, the set of seismic attributes including discontinuity-along-dip;
   determining parameterized results by analyzing the seismic data and the set of seismic attributes using a deep learning neural network, wherein the deep learning neural network includes a dilation module between a first set of convolution layers and a second set of convolution layers, the dilation module comprising a set of dilated convolution layers, each dilated convolution layer of the set of dilated convolution layers including a different dilation factor that defines a different sized gap between adjacent pixels of a set of pixels of an input convolution matrix for an associated dilated convolution operation;

determining one or more fault probabilities of the subterranean formation using the parameterized results; and facilitating hydrocarbon exploration operation using the one or more fault probabilities.

2. The system of claim 1, wherein the deep learning neural network is a convolutional neural network, and wherein the convolutional neural network comprises:
a plurality of convolution layers that include the first set of convolution layers and the second set of convolution layers;
a plurality of pooling layers interspersed between the first set of convolution layers; and
a plurality of upsampling layers interspersed between the second set of convolution layers.

3. The system of claim 2, wherein the dilation module is applicable to the input convolution matrix that includes the set of pixels.

4. The system of claim 1, wherein the operation of determining parameterized results by analyzing the seismic data and the set of seismic attributes using a deep learning neural network includes performing a set of dilated convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

5. The system of claim 1, wherein the deep learning neural network has been trained using a dual-channel input and historical data, wherein the dual-channel input includes the seismic data and the set of seismic attributes, and wherein the historical data includes one or more known locations of geological faults.

6. The system of claim 1, wherein the seismic data includes seismic reflection data, seismic refraction data, seismic shear data, and a plurality of geological pixels that correspond to geographic locations with respect to the subterranean formation, and wherein the set of seismic attributes include discontinuity-along-dip, relative directional amplitude change, sweet, and curvature.

7. The system of claim 6, wherein the operation of determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

8. A method comprising:
receiving seismic data correlating to a subterranean formation;
deriving a set of seismic attributes from the seismic data, the set of seismic attributes including discontinuity-along-dip;
determining parameterized results by analyzing the seismic data and the set of seismic attributes using a deep learning neural network, wherein the deep learning neural network includes a dilation module between a first set of convolution layers and a second set of convolution layers, the dilation module comprising a set of dilated convolution layers, each dilated convolution layer of the set of dilated convolution layers including a different dilation factor that defines a different sized gap between adjacent pixels of a set of pixels of an input convolution matrix for an associated dilated convolution operation;

determining one or more fault probabilities of the subterranean formation using the parameterized results; and facilitating a hydrocarbon exploration operation using the one or more fault probabilities.

9. The method of claim 8, wherein the deep learning neural network is a convolutional neural network, and wherein the convolutional neural network comprises:
a plurality of convolution layers that includes the first set of convolution layers and the second set of convolution layers;
a plurality of pooling layers interspersed between the first set of convolution layers; and
a plurality of upsampling layers interspersed between the second set of convolution layers.

10. The method of claim 9, wherein determining parameterized results by analyzing the seismic data and the set of seismic attributes using a deep learning neural network includes applying the dilation module to the input convolution matrix that includes the set of pixels,
wherein the dilation module is applicable to the input convolution matrix that includes the set of pixels.

11. The method of claim 8, wherein determining parameterized results by analyzing the seismic data and the set of seismic attributes using a deep learning neural network includes performing a set of dilated convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

12. The method of claim 8, further comprising training the deep learning neural network using a dual-channel input and historical data, wherein the dual-channel input includes the seismic data and the set of seismic attributes, and wherein the historical data includes one or more known locations of geological faults.

13. The method of claim 8, wherein the seismic data includes seismic reflection data, seismic refraction data, seismic shear data, and a plurality of geological pixels that correspond to geographic locations with respect to the subterranean formation, and wherein the set of seismic attributes include discontinuity-along-dip, relative directional amplitude change, sweet, and curvature.

14. The method of claim 13, wherein determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

15. A non-transitory computer-readable medium comprising instructions that are executable by a processing device for causing the processing device to perform operations comprising:
- receiving seismic data correlating to a subterranean formation;
- deriving a set of seismic attributes from the seismic data, the set of seismic attributes including discontinuity-along-dip;
- determining parameterized results by analyzing the seismic data and the set of seismic attributes using a deep learning neural network, wherein the deep learning neural network includes a dilation module between a first set of convolution layers and a second set of convolution layers, the dilation module comprising a set of dilated convolution layers, each dilated convolution layer of the set of dilated convolution layers including a different dilation factor that defines a different sized gap between adjacent pixels of a set of pixels of an input convolution matrix for an associated dilated convolution operation;
- determining one or more fault probabilities of the subterranean formation using the parameterized results; and
- facilitating a hydrocarbon exploration operation using the one or more fault probabilities.

16. The non-transitory computer-readable medium of claim 15, wherein the deep learning neural network is a convolutional neural network, and wherein the convolutional neural network comprises:
- a plurality of convolution layers that includes the first set of convolution layers and the second set of convolution layers;
- a plurality of pooling layers interspersed between the first set of convolution layers; and
- a plurality of upsampling layers interspersed between the second set of convolution layers.

17. The non-transitory computer-readable medium of claim 16, wherein the dilation module is applicable to the input convolution matrix that includes the set of pixels.

18. The non-transitory computer-readable medium of claim 15, wherein the operation of determining parameterized results by analyzing the seismic data and the set of seismic attributes using a deep learning neural network includes performing a set of dilated convolutions on parameterized seismic data and parameterized seismic attributes, wherein the parameterized seismic data and the parameterized seismic attributes are respectively the seismic data and the seismic attributes with respect to geological parameters, and wherein the geological parameters include a frequency parameter, a density parameter, an amplitude parameter, a thermal parameter, a radioactivity parameter, and an absorption parameter.

19. The non-transitory computer-readable medium of claim 15, wherein the deep learning neural network has been trained using a dual-channel input and historical data, wherein the dual-channel input includes the seismic data and the set of seismic attributes, and wherein the historical data includes one or more known locations of geological faults.

20. The non-transitory computer-readable medium of claim 15, wherein the seismic data includes seismic reflection data, seismic refraction data, seismic shear data, and a plurality of geological pixels that correspond to geographic locations with respect to the subterranean formation, wherein the set of seismic attributes include discontinuity-along-dip, relative directional amplitude change, sweet, and curvature, and wherein the operation of determining the one or more fault probabilities of the subterranean formation using the parameterized results includes performing semantic image segmentation on the plurality of geological pixels to indicate for each geological pixel of a subset of the plurality of geological pixels a class represented by each geological pixel of a subset of the plurality of geological pixels, wherein the class includes a geological fault and not a geological fault, and wherein the class indicates that a geological fault exists at a geographic location corresponding to one or more geological pixels.

* * * * *